Dec. 18, 1923.
C. O. CAROTHERS
1,477,942
CLAY PIGEON TRAP
Filed Oct. 24, 1922
4 Sheets-Sheet 3
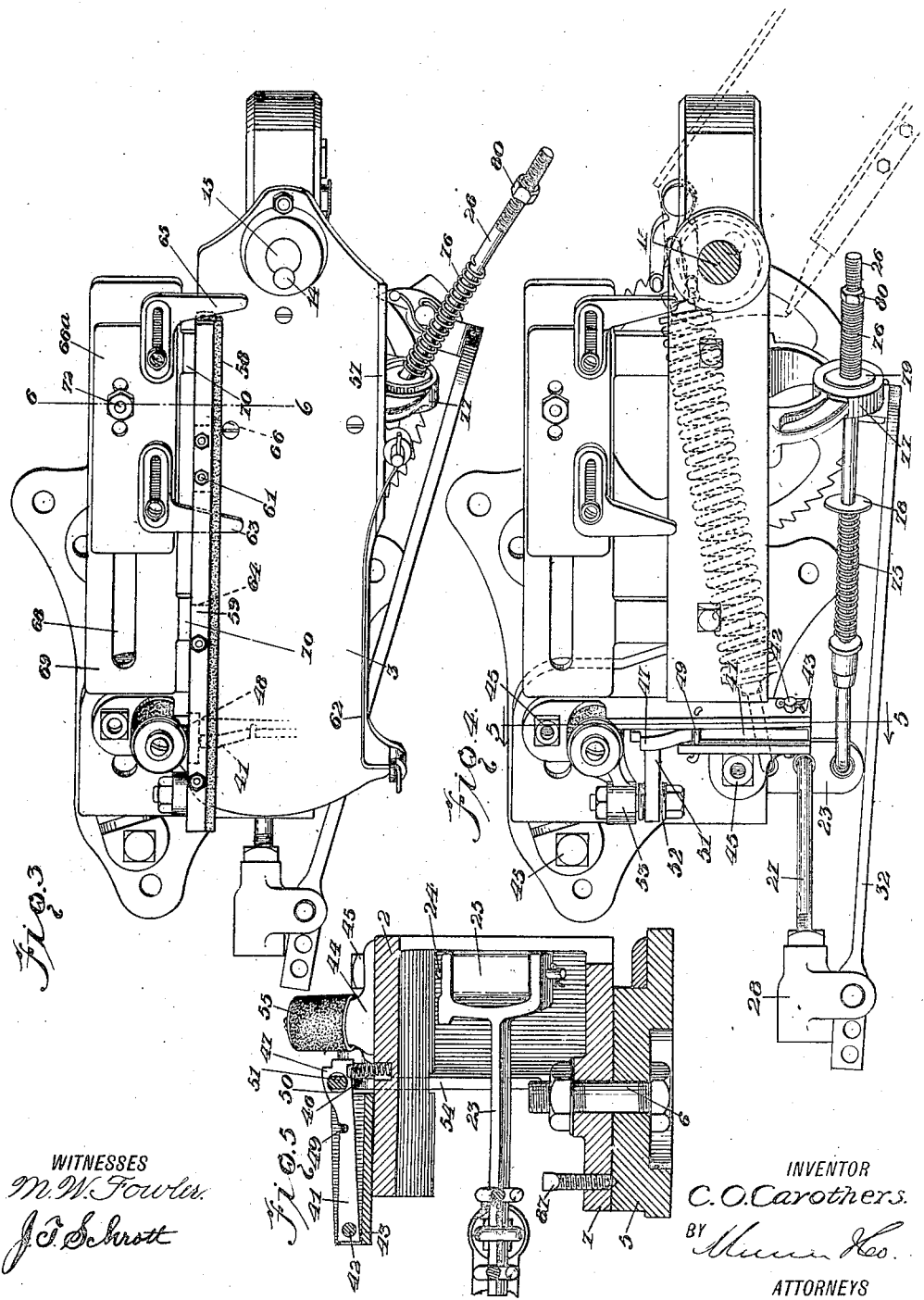
WITNESSES
M. W. Fowler.
J. F. Schrott
INVENTOR
C. O. Carothers.
BY
ATTORNEYS Dec. 18, 1923.  1,477,942
C. O. CAROTHERS
CLAY PIGEON TRAP
Filed Oct. 24, 1922   4 Sheets-Sheet 4
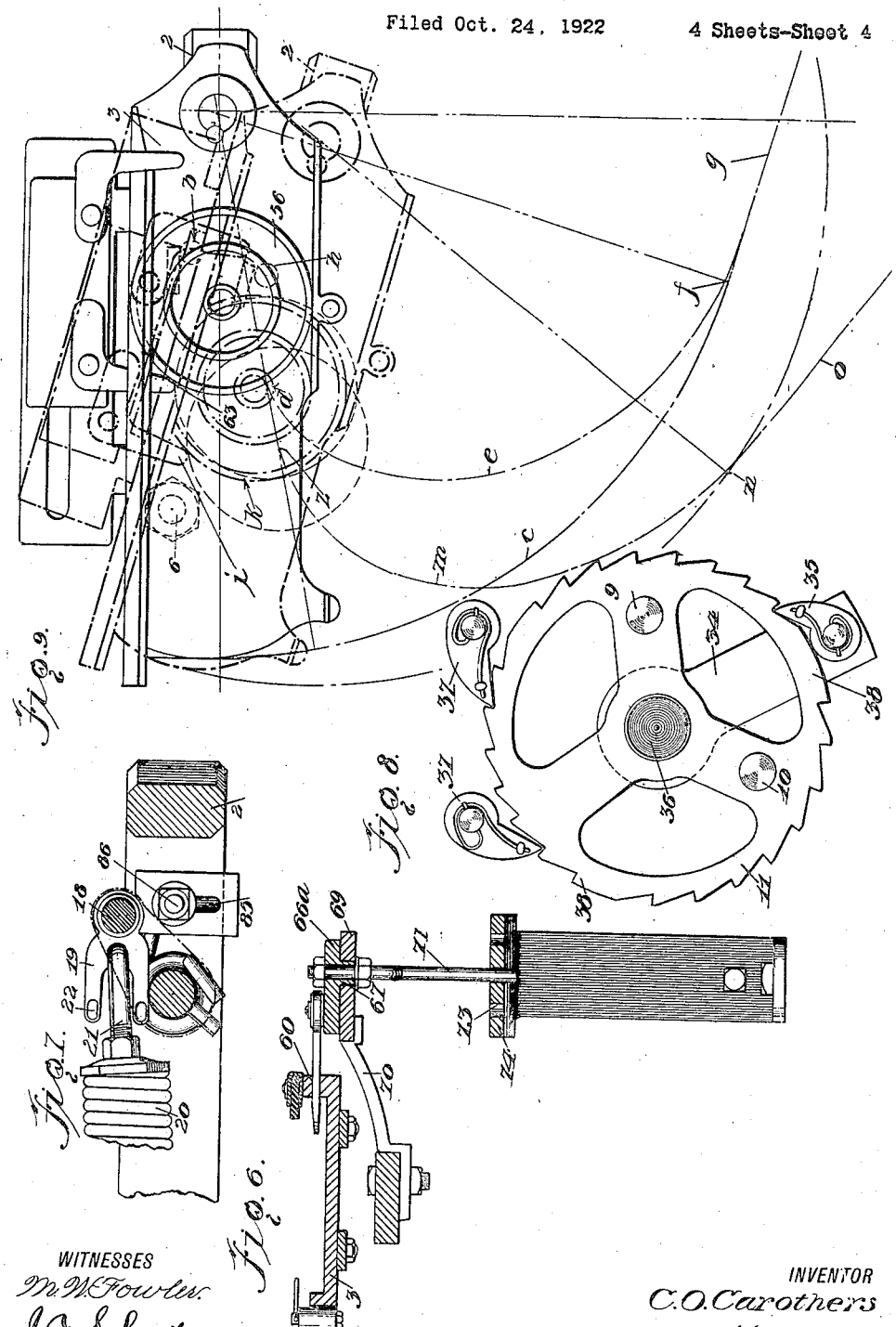
WITNESSES
M. W. Fowler
J. C. Schrott
INVENTOR
C. O. Carothers
BY
ATTORNEYS Patented Dec. 18, 1923.

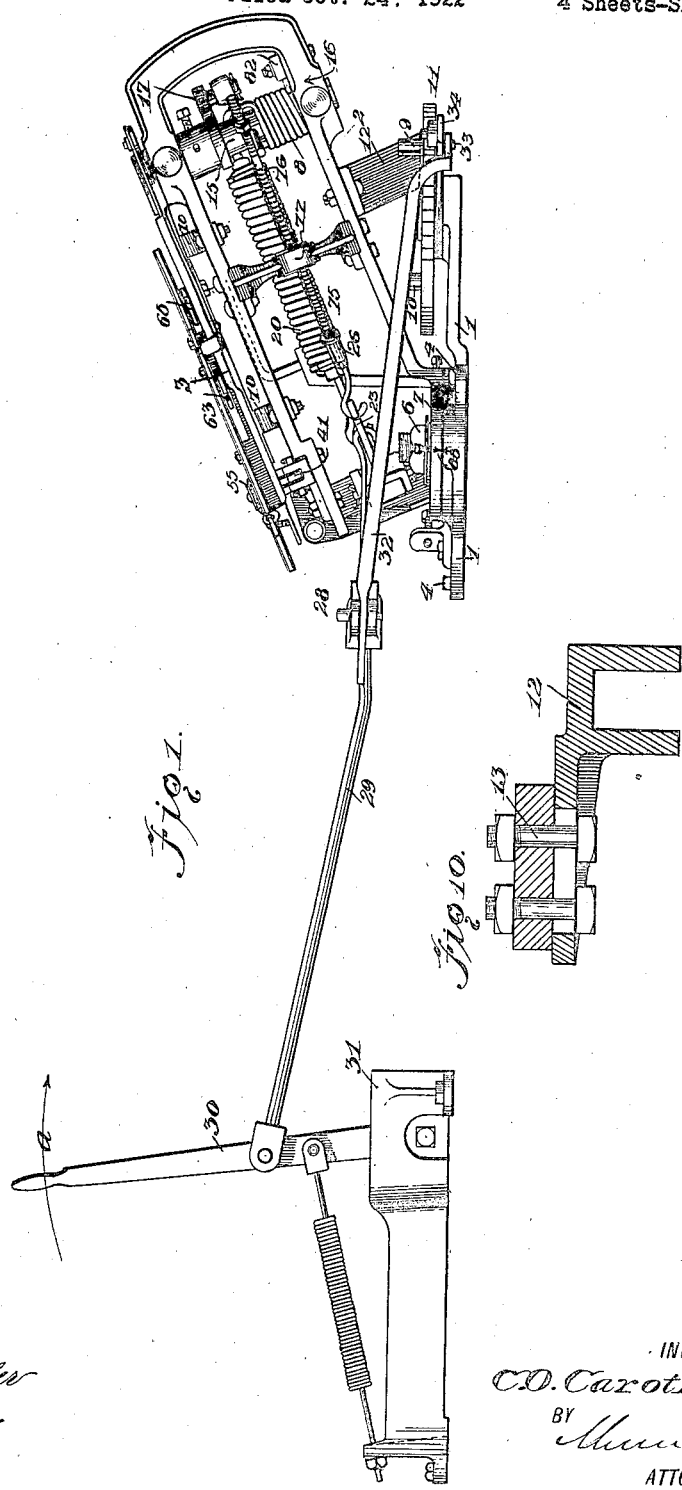

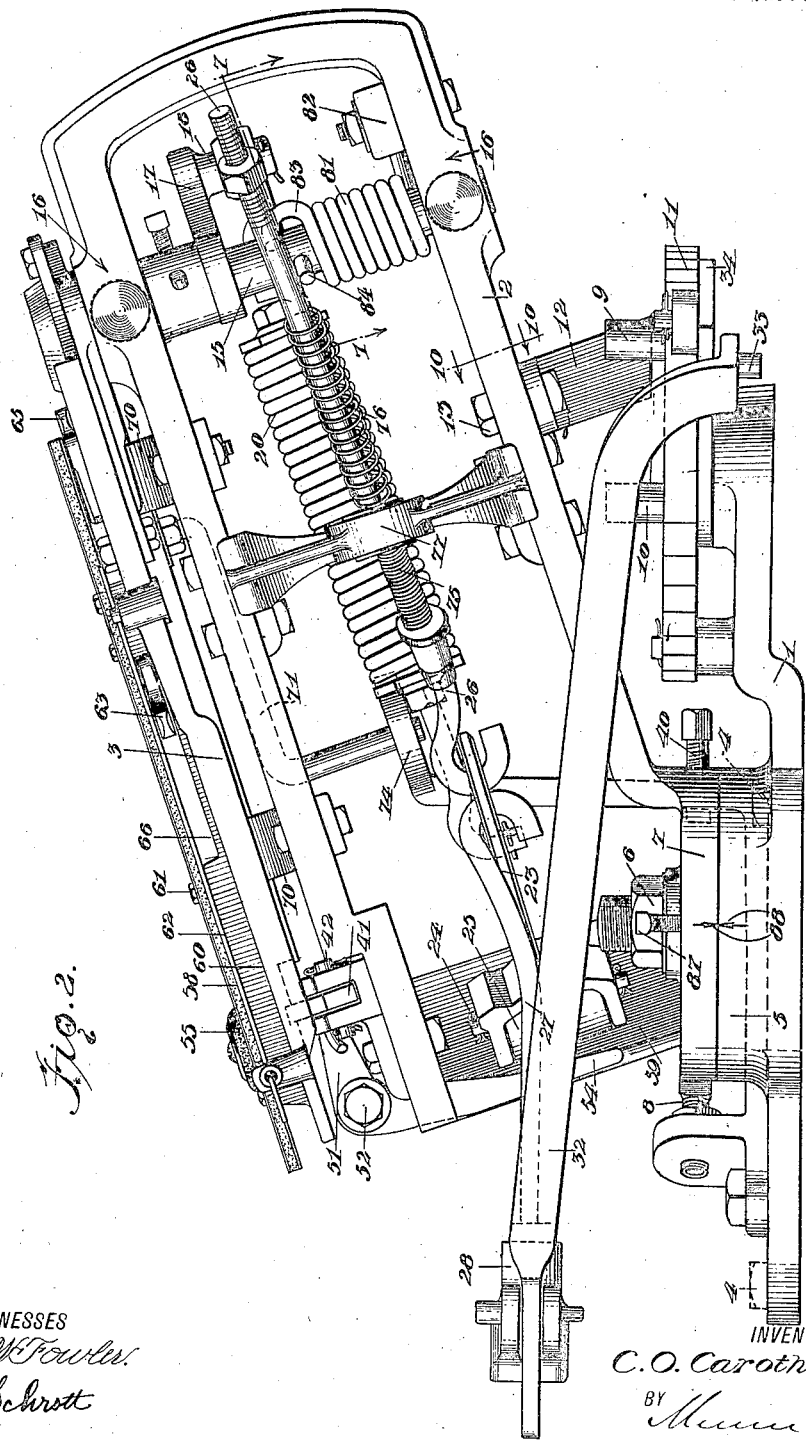

1,477,942

UNITED STATES PATENT OFFICE.

CHARLES O. CAROTHERS, OF KENTON, OHIO.

CLAY-PIGEON TRAP.

Application filed October 24, 1922. Serial No. 596,631.

*To all whom it may concern:*

Be it known that I, CHARLES O. CAROTHERS, a citizen of the United States, and a resident of Kenton, in the county of Harden and State of Ohio, have invented certain new and useful Improvements in Clay-Pigeon Traps, of which the following is a specification.

My invention relates to improvements in clay pigeon traps and it consists of the constructions, combinations and mode of operation herein described and claimed.

An object of the invention is to provide a mechanism for throwing clay pigeons for the purpose of trap shooting, means being embodied in the mechanism to change the angle of the projectile with each throwing operation so that the successive projectiles will depart in different directions in the throwing plane.

A further object of the invention is to provide a target carrier and frame upon which it is mounted and by which it is carried both of which move relatively to each other both in setting and releasing the trap, the amount of movement of the frame varying each time so as to cause successive targets to depart at different angles.

A further object of the invention is to accomplish changing the angles of departure of successive targets automatically, that is to say, without attention or effort on the part of the trap setter.

A further object of the invention is to provide a clay pigeon trap which includes a frame pivotally mounted upon a base in a balanced position and adapted by virtue of said pivotal mounting to cause targets to be thrown either to the right or to the left of a central line.

A further object of the invention is to provide what is hereinafter termed a "rebound spring" which regulates the distance to which the targets are thrown at both the right and left angles, making all targets travel to the same distance.

Other objects and advantages will appear in the following specification, reference being had to the accompanying drawings, in which:

Fig. 1 is a side elevation illustrating a clay pigeon trap constructed in accordance with the invention, Fig. 2 is a side elevation of the clay pigeon trap omitting the setting lever and associated parts, Fig. 3 is a plan view of the trap, Fig. 4 is a similar view omitting the target carrier but showing the latter in the discharging position, parts of the trap being shown in the positions they assume when the trap is set and about to be discharged, Fig. 5 is a section taken substantially on the line 5—5 of Fig. 4, Fig. 6 is a detail cross section taken on the line 6—6 of Fig. 3, Fig. 7 is a detail horizontal section taken on the line 7—7 of Fig. 2, Fig. 8 is a plan view of the ratchet which has lugs with which a stop on the frame cooperates in order to change the angle of the frame at each operation, Fig. 9 is a diagram which illustrates the target discharging function of the trap as is fully described below, and Fig. 10 is a detail cross section on line 10—10 of Fig. 2.

According to a general description, a clay pigeon trap is a device composed of a frame, arms, springs, levers, etc., which are so arranged that the device will throw targets at a distance of about fifty yards and by adjustment throw them at all angles within a radius of approximately 45 degrees. Clay pigeon traps usually work on a pivot and require the attention of an operator to set the trap each time a different angle within the 45 degrees mentioned, is desired.

The rules of trap shooting require that each succeeding target shall be thrown at an angle different from the one last thrown, that is to say, at an angle different from the last one employed within the 45 degree portion of the throwing radius. It is the purpose of this invention to automatically arrange the trap at each successive operation so that it will throw a target at a different angle each time. This is done without effort or attention on the part of the loader or trap setter and hence is accomplished automatically. As the shooter has no way of knowing at precisely what angle the next target is to be thrown, there can be no possible suggestion of collusion between any shooter and the trap setter. Furthermore, the rules of trap shooting require that the targets shall be thrown at least fifty yards and shall travel substantially the same distance at all angles. Tests have proved that targets thrown with the machine described below were carried at the same velocity at all angles within the range of the machine, each target traveling exactly the same distance. This result is accomplished in part by the function of a certain "rebound spring" which serves to check the momentum of the target carrier when delivering in a predetermined portion of the angle of discharge.

Consider now the construction of the clay pigeon trap. It is composed of a base 1, frame 2 and target carrier 3. The base is fixed in one position by any suitable means 4. The base has a boss 5 upon which the frame 2 is pivotally mounted at 6, the pivotal mounting being composed of a bolt or other suitable type of bearing pin upon which the bearing boss 7 of the frame is fitted.

The frame 2 is adapted to swing horizontally upon its pivotal mounting 6, being limited in its movement toward the left by a stop 8 on the base and toward the right by pins 9 and 10 on a ratchet 11. The frame has a lug 12 to engage the pins when moving toward the right. The lug does not engage both pins at once but does engage one or the other, depending on which one is in the path of the lug. Furthermore, the lug is made double, as shown in Fig. 10, so as to insure engagement with a pin should the lug assume such a position that one of the lug members will pass without striking. The lug is laterally adjustable on the frame by the means 13.

As clearly shown in Fig. 2, the frame 2 stands at an acute angle to the ground. The obvious purpose of this arrangement is to insure throwing the targets up into the air. The target carrier 3 by which the throwing is accomplished, is keyed at 14 (Fig. 3) to the upper end of a shaft 15 which has bearing at 16 on the frame. The frame is generally of an open rectangular shape, the target carrier 3 being mounted on top and other parts of the operating mechanism are disposed on what might be termed the inside.

Keyed to the shaft 15 on the inside of the frame 2 is a crank 17. The pin 18 of the crank carries a brass or other link 19 to which one end of a coil spring 20 is attached. The connection between the spring and the link is not made directly, but is made through a coupling bolt 21. Lugs 22 on the ends of a pair of arms which are included in the links 19, are adapted to engage the bolts 21 when setting the trap and thereby prevent the links 19 from swinging outwardly in either direction from the pin 18. The lugs 22 and bolts 21 rigidify the connection of the spring 20 to the links to a certain extent.

A connection similar to the bolt 21 is made between the opposite end of the coil spring 20 and an operating arm 23. This arm is pivoted at 24 to a lug 25 on the inside of the rear bridge portion of the frame 2. This arm has three holes to receive the connection of the coil spring, the hook end of a tension rod 26 and the hook end of a pull link 27 respectively. The pull link is fastened to a coupling 28 in which one end of the setting rod 29 (Fig. 1) is fastened. The other end of this rod is pivotally attached to the setting lever 30, which lever is carried by a casting 31 located at the trap operator's station. The rod 29 may be as long as desired.

Adjustably attached to the coupling 28 is one end of a dog bar 32, the other end of which has connection at 33 with a dog arm 34 (Fig. 8). This arm carries a dog 35 and being pivoted on the same shaft 36, upon which the ratchet 11 has bearing, is susceptible to such movement as will convey the dog 35 in an arcuate path around a portion of the periphery of the ratchet and thereby advance the ratchet at each forward movement of the setting lever 30. A forward movement of the setting lever is in the direction of the arrow a in Fig. 1, and a rearward movement would be the reverse. Counter-rotation of the ratchet is obtained by a pair of dogs 37 which are mounted on an extension of the base 1 in any convenient manner. The ratchet 11 has one or more blank teeth 38 for the purpose of producing a variation in the operation of the ratchet and adding to the uncertainty of the angles at which the frame 2 will be stopped.

As far as described, the reader will understand that a forward movement of the setting lever 30 will exert a push on the operating arm 23 through the medium of the link 27 and cause the frame 2 to rock on its pivot 6 toward the left until an adjacent part of the rear bridge 39 strikes against the stop 8. If found desirable at any time, the bridge 39 may also be made to strike against a front stop 40 so as to limit the movement of the frame 2 toward the right, but as the limiting of this particular direction of movement is taken care of by the pins 9 and 10 and lug 12, the stop screw 40 will be screwed out to an inoperative position and simply left in place for such times when its use may be desired. The aforesaid forward movement of the setting lever 30 causes the carrier 3 to turn from the discharging position (dotted lines in Fig. 4) to the set position in Fig. 3. It is easy to see that the forward movement of the setting lever causes the operating arm 23 to swing forwardly also and as the spring 20 is connected to this arm, it follows that the crank 17 will be pushed in an arc at the left of the shaft 15 (Fig. 7) and thus turn the carrier in a clockwise direction until it catches on the latch 41. It is here that the reader can more fully appreciate the purpose of the lugs 22. The lowermost lug will engage the bolt 21 and so prevent the links 19 merely swinging around on the shaft 18.

The latch 41 (Fig. 5) is pivoted at 42 in the U-shaped portion 43 of a frame or casting 44 which is bolted in place on the frame 2 at 45. A spring 46 lifts the free end of the latch so that the shoulder 47 stands in readiness to engage a keeper 48 on the underside of the carrier. The upward movement of the latch is limited by a pin 49 which extends across the U-frame 43.

An opening 50 adjacent to the free end of the latch is adapted to receive the end 51 of a release crank. This crank is pivoted at 52 on a boss 53 which extends to one side of the casting 44. The other arm 54 extends down from the pivotal point so as to stand in the way of the operating arm 23.

Should the operator now draw back on the setting lever 30 in the direction opposite to the arrow $a$ in Fig. 1, the operating arm 23 will be drawn back correspondingly and put the coil spring 20 under tension. It is this spring that furnishes the motive power for the propulsion of the target carrier 3 to the discharging position. Assuming the target carrier to be in such position in Fig. 3 and held by virtue of the engagement of the latch shoulder 47 with the keeper 48, the reader will readily understand that as soon as the arm 23 is drawn back far enough to reach the release crank 54, that crank will be rocked to depress the latch and release the carrier. The spring 20, now under tension, pulls down on the crank 17 and whirls the carrier 3 around with its axle to discharge the target. It should have been stated that the casting 44 carries a rubber bumper 55 against which the carrier strikes when returned to the set position in Fig. 3.

The target consists of a disk 56 (Fig. 9) of clay or other suitable material which is inserted between the outer flange 57 and the guide 58 of the target carrier. The guide consists of a rubber strip which is mounted in a metallic clip 59 on top of a flange 60 (Fig. 6) to which it is secured by the means 61. The purpose of the rubber guide strip is to engage the targets and obviate any undue looseness thereof. A guide wire 62 at the uppermost end of the leading edge of the carrier accomplishes the purpose of holding the target down on the carrier so as to prevent the wind from getting under the targets and guiding them higher than their regular flight.

An angling finger 63 offers a stop for the target when inserted in place on the carrier. This finger projects through a slot 66 in the flange 60 and extends over the carrier 3 a short distance. A similar finger 65 is adapted to move in a slot 66 in the flange 60. The latter finger assumes a position reverse of that of the finger 63. Its purpose is merely to follow the angling finger 63.

Both fingers are mounted on a slide $66^a$ and are arranged so as to be capable of adjustment if such should be necessary. The slide has a tongue 67 which occupies a position in the slot 68 of a table 69. This table is supported by brackets 70 from the upper arm or deck of the frame 2 and for this reason the table 69, slide $66^a$ and fingers 63, 65 swing with the frame 2 when the latter is swung on its fulcrum 6.

The slide $66^a$, however, partakes of a sliding motion on the table, for which purpose the tongue 67 and slot 68 are provided. This sliding motion is accomplished by a reversed S-shaped rod 71 (Fig. 2), the upper bent end of which has connection at 72 with the slide $66^a$, the lower bent end of which is inserted in one of a plurality of openings 73 of a stand 74 (Fig. 6). This stand is secured in place on the base 1.

Remembering that the base 1 is fixed (and that the stand 74 is also fixed as a consequence) the reader will see that moving the frame 2 toward the left as in the setting position will cause the slide $66^a$ to ride upwardly on the table 69 by virtue of the connection of the S-rod 71. This puts the angling finger 63 in the desired position, which may be regarded as an initial or fixed position (for it does not vary in respect to any other part of the machine) to receive the target 56. Moving the frame 2 toward the right as in the discharging position, will result in a downward movement of the slide $66^a$ on the table 69.

But the slide $66^a$, and consequently the finger 63, does not always have the same degree of movement, and in fact, the length or degree of movement is never the same in consecutive operations because the length of swinging motion of the frame 2 is perpetually either lengthened or shortened by virtue of the changing positions of the pins 9 and 10 on the ratchet 11. This can be readily understood. Each forward or setting motion turns the ratchet 11 one step. That places either the pin 9 or 10 one step nearer to the lug 12. The frame is therefore stopped the distance of one lug less on moving toward the right in a discharging operation. This stopping at a distance of one lug less, results in a reduction of the movement of the finger 63 so that the place of release of the target 56 will be at a point slightly higher up on the carrier than the place of release of the target preceding.

Mention is made above of the tension rod 26, the hook end of which occupies the last one of the plurality of holes in the end of the operating arm 23. This tension rod carries two springs 75 and 76, one on one side of a steering bracket 77, another on the other side. The bearing bracket is fixed in place between the upper and lower members of the frame 2. There is an opening in the bearing hub of the bracket to let the rod through, but this opening is considerably larger than the diameter of the rod in order to permit the rod to assume the rather extreme position in Fig. 3. By virtue of the size of this opening, it is necessary to provide something for the springs to bear against and the washers 78 and 79 furnish such bearing.

When the setting lever 30 is pulled back, the tension rod 26 is pulled back correspondingly (Fig. 4) and the spring 76 is compressed against the bearing 7 by a nut 80 on the end of the rod. The tension of the spring 76 holds the frame 2 (lug 12) firmly against the stop on the ratchet. When setting the trap the spring 75 is put under tension (see Fig 2 which is intended merely for illustration) and thus push the frame 2 toward the left until it is checked by the stop 8.

It has been pointed out that the target has the longest distance to travel when retained by the angling finger 63 in the uppermost position in respect to the carrier, and the shortest distance to travel when retained by the finger at the lowermost position in respect to the carrier. In order to offset the tendency of throwing a target to a greater distance when released at the uppermost position of the finger 63 a spring 81 is arranged in such a way as to check the carrier in its movement. This is the "rebound spring" mentioned on two occasions above.

This spring is coiled around the lower end of the shaft 15. The lowermost end is fastened beneath a stirrup 82, the uppermost end being free but turned over into the shape of a hook 83. The shaft carries a pin 84 which is adapted to engage the hook 83, whereupon the spring absorbs the shock of contact and acts as a brace to diminish the speed of the carrier 3. The pin 84 does not engage the hook until the carrier has made about two-thirds of its flight, whereupon the pin comes into contact with the hook of the rebound spring, checks the speed of the carrier and secures the result of throwing the target out the same distance regardless of whether the target was released at the high point of the finger 63 or at the low point thereof. The stirrup 82 has a slot 85 which the shank of a bolt 86 occupies. This arrangement enables adjustment of the rebound spring so that the pin may be made to engage the hook early or late in its arcuate movement and consequently regulate the width of the angle or area of distribution.

A set screw 87 (Figs. 2 and 5) enables fixing the frame 2 so that it will not rock on its fulcrum 6 at each setting and discharging operation. When thus set, the frame is intended to assume a substantially mid-position between the extremities of its lateral movement. Such position is indicated by marks 88 on the bearing 7 and boss 5. The purpose of thus setting the frame is to utilize the trap for double target shooting. Double targets are not likely to prescribe the same paths in succession and therefore the angle changing function of the frame may be omitted.

The operation may be briefly summarized. The diagram in Fig. 9 is described immediately below. Assume the pin 9 to have traversed its circular path until it assumes the position $b$. Very little room is left for the frame 2 to swing on the fulcrum 6 and consequently the angling finger 63 assumes its uppermost position in respect to the target carrier 3.

Upon the release of the carrier 3 (which is accomplished by pulling back on the setting lever 30 in Fig. 1) the carrier will swing around on the arc $c$. The target 56 will be retained on the carrier until the carrier has swung far enough to enable the target to pass beneath the end of the finger 63. This it does at the point $d$, and together with thereafter moving in an outward direction on the carrier and the carrier itself moving in a circular path, causes the target to prescribe a parabolic curve $e$ until the point of release $f$ is reached. At this point, the target departs on a tangent and is thrown up in the air substantially along the line $g$. Assume next that the pin 9 occupies the position $h$. This represents the other extremity of the frame 2, the position of which is indicated in dot and dash lines. The angling finger 63 will have slid down to the position $i$ and a target now inserted in the carrier will assume the position $k$ instead of the full line position formerly described. Upon releasing the carrier, the movement of the target will begin at the point $z$ and the combined outward movement of the target and the circular movement of the carrier will result in the parabolic path $m$ of the target which ends at the point $n$ from which the target departs at a tangent $o$ into space.

The reader will observe that in the first instance given above, the point of release of the target 56 (full lines) was higher up on the target carrier 3 (nearer the shaft 15) and consequently it was subjected to a greater sweep, or brought under the influence of the centrifugal force to a greater extent than was the target $k$, cited in the second instance. The diagram in Fig. 9 is not entirely correct, as regards the point of departure $f$ and $n$ because the target carrier swings around approximately 180 degrees, and even more. However, as an illustration of what actually occurs in the operation of the trap, the diagrammatic lines in Fig. 9 are believed adequate to fulfill the purpose. As the frame 2 will change its position between the extremes illustrated in Fig. 9 with each operation of the trap it follows that the angling finger 63 will also assume different positions between the extremes illustrated in full and dot and dash lines. This in turn means that the point of departure of the target will be different each time because the carrier does not describe the same arc in successive operations. Assume the trap to be in a discharging position. Such a position is suggested by the dotted lines in Fig. 4.

In order to set the trap, the operator first pushes forwardly in the direction of the arrow $a$ in Fig. 1. This, through the medium of the link 27, pushes forwardly on the arm 23 so that the spring 75 compresses against the bearing 77 and rocks the entire frame 2 toward the left on its fulcrum 6. This movement of the frame is limited by the stop 8 (Fig. 2). Pushing forwardly on the arm 23 causes the spring 20 (which is connected to the arm) to push on the crank 17 in a clockwise direction so that the carrier 3 is brought around into the full line position in Fig. 3, caught by the latch 41 and held in the set position by virtue of the engagement of the shoulder 47 with the keeper 48. The same forward movement described, swings the dog arm 34 through the medium of the rod 32 so that the dog 35 turns the ratchet wheel 11 to a new place and shifts the positions of the pins 9 and 10. These acts are accomplished in the setting operation.

To discharge the trap, the operator pulls back on the setting lever 30. This in turn causes a backward pull on the operating arm 23 so that the coil spring 20 is put under tension. Putting the spring under tension tends to revolve the shaft 15 and target carrier 3 in the counter-clockwise direction, but such tendency is checked by the latch 41. However, the operating arm 23 will soon reach the arm 54 of the latch releasing crank which, upon engagement by the arm 23, will depress the latch and release the carrier. The stored tension in the spring 20 simply swings the carrier around as described in connection with Fig. 9 and causes the discharge of the target. The same backward pull of the lever 30 and of the arm 23 causes a pressure on the upper side of the bearing 77 by virtue of the engagement of the spring 76 and thus moves the frame 2 around until the lug 12 engages and is stopped by one or the other of the pins 9, 10, whichever happens to be in position.

While the construction and arrangement of the improved clay pigeon trap as herein described and claimed, is that of a generally preferred form, obviously modifications and changes may be made without departing from the spirit of the invention or the scope of the claims.

I claim:—

1. A clay pigeon trap comprising a target carrier, means to move the carrier into a discharging position, and means extending over the carrier while in the loading position to retain a target on the carrier until the carrier has moved away from said means in passing to the discharging position.

2. A clay pigeon trap comprising a target carrier, a finger extending over the carrier to retain a target in a substantially stationary position on the carrier until the end of the finger is passed, and means to swing the carrier into a discharging position.

3. A clay pigeon trap comprising a target carrier, means to move said carrier into a position to discharge a target carried thereby, and target contacting means movable in respect to the carrier while moving to said discharging position to regulate the point of discharge of said target from the carrier so as to vary the angle of flight from the angle of flight of a preceding target.

4. A clay pigeon trap comprising a target carrier, means to move said carrier to discharge a target carried thereby, means disposed over the carrier to retain the target a predetermined time before releasing it when the carrier moves to said discharging position, and means to vary the position of said retaining means in respect to the carrier to accordingly vary the time of release of the target and change the angle of flight of a target from that of a preceding one.

5. A clay pigeon trap comprising a target carrier, means to move said carrier to discharge a target carried thereby, means disposed over the carrier to retain the target on the carrier until the carrier has moved far enough to enable the target to pass said retaining means, and means to move the retaining means to a different position in respect to the carrier at each discharging operation and before the carrier is moved in such operation.

6. A clay pigeon trap comprising a target carrier, means to move the carrier to discharge a target carried thereby, means located in respect to the carrier to retain a target until the carrier has moved far enough to let the target pass said retaining means, and means to shift said retaining means longitudinally of the carrier and in a different position in respect thereto at each target discharging operation but prior to the movement of said carrier in accomplishing said operation.

7. A clay pigeon trap comprising a target carrier, a frame upon which the carrier is mounted to swing to a discharging position, means carried by the frame and disposed over the carrier to retain a target in substantially one place until the carrier has moved far enough to let the target pass said means, means to change the position of the frame with each trap shooting operation to accordingly change the position of the carrier, and means to shift said retaining means in respect to the carrier with each change of position of the frame to vary the place at which the targets are held.

8. A clay pigeon trap comprising a target carrier, a frame on which the carrier is mounted to move to a discharging position, means carried by the frame and extending over the carrier to retain a target in substantially one position until the carrier moves far enough to let the target pass said retaining means, a base upon which the frame is pivotally mounted, means to adjust the frame upon said mounting so that it assumes different radial positions, and means for shifting said retaining means with each of said adjustments.

9. A clay pigeon trap comprising a target carrier, a frame upon which the carrier is mounted to swing to a discharging position, means carried by the frame extending over the carrier to retain a target in substantially one position until the carrier swings far enough to let the target pass said retaining means, a base upon which the frame is pivotally mounted, means causing the frame to turn on its pivotal mounting with each shooting operation to thereby adjust it to a different radial position, and means connected between said retaining means and the base causing the retaining means to assume a different position in respect to the carrier with each frame adjustment to thereby vary the place at which the targets are retained on the carrier.

10. A clay pigeon trap comprising a target carrier, a frame upon which the carrier is mounted to swing to a discharging position, a latch holding the carrier in a set position, a base on which the frame is pivotally mounted, means carried by the frame extending over the carrier to retain a target in substantially one position until the carrier has moved far enough to let the target pass said retaining means, means through which the frame is caused to swing on its pivotal mounting to a predetermined position and which then engages the latch to release the carrier, and connecting means between said retaining means and the base causing the former to assume a retaining position in respect to the carrier as the frame moves but before the carrier is released.

11. A clay pigeon trap comprising a target carrier, a frame, a shaft by which the carrier is mounted on the frame, means to turn the shaft and thereby move the carrier to a discharging position, means on the frame to retain the carrier in the loading position, means carried by the frame extending over the carrier while in the loading position to retain a target until released by said means as the carrier moves to the discharging position, a base on which the frame is pivotally mounted, operating means to which the shaft turning means has connection having connecting means to first turn the frame on its pivot then depress the latch to release the carrier, and connecting means between said retaining means and the base to shift the retaining means during the turning of the frame.

12. A clay pigeon trap comprising a base, a frame pivotally mounted thereon, a target carrier, a shaft by which the carrier is mounted on the frame, means including a spring having a connection to turn the shaft and thereby move the carrier to a discharging position, a latch on the frame to hold the carrier in a loading position, an operating arm mounted on the frame to which the other end of the spring is connected, a connection between said arm and a part of the frame to swing the frame on its pivot when said arm is moved to put the spring under tension, means carried by the frame extending over the carrier while in the loading position to retain a target until released by the retaining means as the carrier moves to the discharging position upon disengagement of the latch upon continued movement of said arm, and a connection between said retaining means and the base causing the former to shift as the frame swings on its pivot.

13. A clay pigeon trap comprising a base, a frame pivotally mounted upon the base, a target carrier mounted on the frame, a finger carried by the frame and extending over the carrier to support a target in a predetermined position on the carrier, means to swing the frame on its pivot to assume different radial positions in respect to the base, and a connection between said finger and the base to shift the finger to different positions in respect to the carrier accordingly as the frame is swung.

14. A clay pigeon trap comprising a base, a frame pivotally mounted upon the base, a target carrier mounted on the frame, a finger extending over the target carrier to retain a target thereon in a predetermined position, a slide by which the finger is mounted on the frame adjacent to the carrier, means to swing the frame on its pivot to different radial positions in respect to the base, and a connecting link between the slide and the base to accordingly shift the finger to different positions in respect to the carrier as the frame is swung, as aforesaid.

15. A clay pigeon trap comprising a base, a frame pivotally mounted upon the base, a target carrier mounted on the frame, a finger carried by the frame and extending over the carrier to retain a target on the carrier a predetermined time, means to swing the frame on its pivot causing it to assume different radial positions, stop means which is adjustable in respect to the frame in order to determine said different positions, and a connection between the base and said retaining means to move the latter along the frame as the frame is swung and thereby assume different positions in respect to the carrier.

16. A clay pigeon trap comprising a base, a frame pivotally mounted upon the base, a target carrier mounted on the frame, a finger carrier by the frame and extending over the carrier to retain a target in a predetermined position, means to swing the frame on its pivot causing it to assume different radial positions, means carried by the base and having stop means to cooperate with the frame, means to move said stop-carrying means to vary the position of the stop and thereby determine the aforesaid radial positions, and connecting means between the finger and the base to move the finger along the frame and in respect to the carrier as the frame is swung, to thereby vary the position at which the targets are retained.

17. A clay pigeon trap comprising a base, a frame pivotally mounted on the base, a target carrier mounted on the frame, a finger carried by the frame and extending over the carrier to retain a target on the carrier in a predetermined position, adjustable stop means mounted on the base, operating means movable in one direction to set the carrier in a loading position on the frame and adjust the position of the stop means and in the other direction to swing the frame against said stop means and cause the release of the target carrier for the discharge of the target, and connecting means between the finger and the base to move the finger along the frame as the frame is moved against the stop means to adjust the finger in respect to the carrier before the carrier is released.

18. A clay pigeon trap comprising a base, a wheel mounted to turn on the base, a pin carried by the wheel, a frame pivotally mounted on the base to swing over the wheel, and engage the pin, a target carrier mounted on the frame, a finger carried by the frame and extending over the carrier to retain a target in a predetermined position thereon, operating means which is movable in one direction to set the carrier in a loading position on the frame and at the same time turn the wheel so as to adjust the pin, and movable in the other direction to swing the frame against the adjusted pin then release the target carrier for the discharge of the target; and a fixed link connecting the finger to the base to move the finger along the frame as the frame is swung against the pin to adjust the position of the finger in respect to the carrier before the latter is released.

19. A clay pigeon trap comprising a base, a ratchet carrying a pin journalled on the base, a frame journalled on the base to swing over the ratchet and engage the pin, a target carrier mounted on the frame, a finger carried by the frame and extending over the carrier to retain a target in position, operating means which is movable in one direction to set the carrier in the loading position on the frame and impart a step movement to the ratchet to adjust the pin in position, means in connection with the frame and said operating means to swing the frame on its pivot to engage said pin on a movement of the operating means in another direction, means then operated by said operating means to release the carrier, and means connecting the finger to the base, moving the finger along the frame as the frame swings to adjust the position of the finger in respect to the carrier before said release.

20. A clay pigeon trap comprising a target carrier, a shaft upon which the carrier is mounted to swing to a target discharging position, a finger extending over the carrier to retain a target on the carrier until it swings far enough to escape the retaining means, means to shift the retaining means along the carrier to vary the position of release of the target and also the angle at which the target will be discharged, and means associated with the shaft to check the momentum of the carrier and insure a uniform velocity of discharge of all targets 21. A clay pigeon trap comprising a target carrier, a shaft on which the carrier is mounted to swing into a discharging position, means to turn the shaft and thereby move the carrier to said discharging position, a pin fitted in the shaft, and a spring arranged to be engaged by the pin at a determined time in the revolution of the shaft to check the momentum of the carrier.

22. A clay pigeon trap comprising a target carrier, a shaft on which the carrier is mounted, means to turn the shaft and thereby move the carrier to a discharging position, a pin fitted in the shaft, a spring arranged to be engaged by the pin at a determined time in the revolution of the shaft to check the momentum of the carrier, and means to adjust the spring to change the place of engagement of the pin.

23. A clay pigeon trap comprising a target carrier, a shaft on which the carrier is mounted, a crank on the shaft, a spring in connection with the crank and which is adapted to be put under tension to revolve the shaft and move the carrier to a discharging position, a pin fitted on the shaft, a spring coiled about a portion of the shaft, and a hook formed at one end of the spring adapted to be engaged by the pin in a determined part of the revolution of the shaft to check the momentum of the carrier.

24. A target trap comprising an oscillatory frame, means by which the oscillations of the frame are made variable in degree, a target carrier on the frame, target contacting means associated with the carrier, and means for varying the position of the contacting means in respect to the carrier with each oscillation of the frame.

25. A target trap comprising an oscillatory frame, a target carrier on the frame, target contacting means associated with the carrier, and means for shifting the contacting means in respect to the carrier with each oscillation of the frame to perpetually vary the position on the carrier at which a target is retained prior to a discharging operation.

26. A target trap comprising a base adapted to remain stationary, a frame mounted to oscillate on the base, a target carrier on the frame, target contacting means so associated with the carrier as to retain a target thereon prior to and during an initial period of the discharging operation, and means associated both with the base and said contacting means to shift the latter upon an oscillation of the frame on the base to change the position of the contacting means in respect to the carrier and accordingly vary the time of initial retention of the target in the aforesaid discharging operation.

27. A target trap comprising a base adapted to be stationary, a frame oscillatory on the base, a target carrier oscillatory on the frame, target contacting means associated with the carrier to retain a target in position prior to and during an initial period in a discharging operation, means movable upon the frame by which said contacting means is carried, means on the base for varying the oscillation of the frame for each discharging operation, and connecting means between the base and said carrying means to move it and the contacting means to a new position in respect to the carrier with each of the aforesaid discharging operations.

28. A target trap comprising an oscillatory frame, trap operating means including means for swinging the frame in one direction in a setting operation and in the reverse direction in a discharging operation, a carrier on the frame, a latch on the frame by which the carrier is adapted to be caught in said setting operation, and means for actuating the latch to release the carrier in said discharging operation.

29. A target trap including an oscillatory frame, trap operating means including an operating arm and a tension rod adapted to move forwardly and reversely upon actuation of the operating means, means carried by the frame through which the tension rod passes, and resilient means carried by the rod and contacting said last means on each side to exert pressure on one side and then the other in the aforesaid actuations to swing the frame first in one direction and then the other.

30. A target trap including an oscillatory frame, trap operating means including an operating arm and a tension rod adapted to move forwardly and reversely upon actuation of the operating means, means carried by the frame through which the tension rod passes, resilient means carried by the rod and contacting said last means on each side to exert pressure on one side and then the other in the aforesaid actuations to swing the frame first in one direction and then the other, and stop means associated with the frame for limiting the swinging movement in said directions.

31. A target trap including an oscillatory frame, trap operating means including an operating arm and a tension rod adapted to move forwardly and reversely upon actuation of the operating means, means carried by the frame through which the tension rod passes, resilient means carried by the rod and contacting said last means on each side to exert pressure on one side and then the other in the aforesaid actuations to swing the frame first in one direction and then the other, stop means associated with the frame for limiting the swinging movement in said directions, and means which is actuated at alternate operations of the operating means to variously adjust said stop means and accordingly vary the swinging movement of the frame.

32. A target trap including a target carrier having a crank, a spring having connection to the crank and being adapted to swing the carrier to a discharging position, and trap operating means adapted to push on said spring in the direction of contraction in a setting operation to turn the crank and move the carrier to a set position.

33. A target trap including a target carrier having a crank, a spring having connection to the crank and being adapted to swing the carrier to a discharging position, trap operating means adapted to push on said spring in the direction of contraction in a setting operation to turn the crank and move the carrier to a set position, and means by which connection of the spring is made with the crank arranged to rigidify said connection so that the thrust of the spring is imparted directly to the crank.

34. A target trap including a target carrier having a crank, a spring adapted to move the carrier to a discharging position, a link by which the spring is connected to the crank, trap operating means adapted to exert an effort on the spring in the direction of contraction to move the carrier into the set position, and arms included in said link having lugs disposed on each side of the end of the spring to prevent the link from swinging outwardly in either direction and thus rigidify the connection of the spring with the link.

35. A target trap including a frame, a carrier mounted to swing on the frame, a flange at one side of the carrier having an opening, and a finger supported by the frame and extending through the opening to a position over the carrier in respect to both of which the finger is adapted to move.

36. A target trap comprising a base, a frame oscillatory on the base, a target carrier oscillatory on the frame, a spring by which the target carrier is adapted to be moved to a discharging position, and trap-operating means which is movable in one direction and includes connections adapted to swing the frame into a predetermined position in respect to the base and to exert a force on the spring in the direction of contraction to move the carrier to a set position in respect to the frame.

37. A target trap comprising a base, a frame oscillatory on the base, a target carrier oscillatory on the frame, a spring by which the target carrier is adapted to be moved to a discharging position, trap operating means which is movable in one direction and includes connections adapted to swing the frame into a predetermined position in respect to the base and to exert a force on the spring in the direction of contraction to move the carrier to a set position in respect to the frame, and means carried by the frame adapted to catch and hold the carrier in said set position.

38. A target trap comprising a base, a frame oscillatory on the base, a target carrier oscillatory on the frame, a spring adapted to move the carrier to a discharging position, an operating arm carried by the frame to which an end of the spring is connected, a tension rod attached to said arm having connection with a portion of the frame, and trap operating means including a link in connection with the operating arm movable in one direction to swing the frame a predetermined distance in respect to the base through said tension rod and move the carrier to a set position in respect to the frame through a compressing action on said spring.

39. A target trap comprising a base, a frame oscillatory on the base, a target carrier oscillatory on the frame, a spring adapted to move the carrier to a discharging position, an operating arm carried by the frame to which an end of the spring is connected, a tension rod attached to said arm having connection with a portion of the frame, trap operating means including a link in connection with the operating arm movable in one direction to swing the frame a predetermined distance in respect to the base through said tension rod and move the carrier to a set position in respect to the frame through a compressing action on said spring, and means providing a connection between the spring and said carrier for the performance of said function including means causing said compressing action to be fully utilized in the setting action of the carrier.

40. A target trap comprising a target carrier, means along the longitudinal edges of the carrier for guiding a target, an angling finger extending through the guide means at one side for retaining a target, a second angling finger spaced from the first adapted to follow said first angling finger, means upon which said angling fingers are mounted, and means for moving said mounting means in respect to the carrier.

41. A target trap comprising a frame having a table, a target carrier which is mounted to swing on said frame, guide means along the longitudinal edges of the carrier for guiding a target, a pair of spaced angling fingers extending through one guide means and adapted to have a target positioned therebetween, a slide carrying said fingers mounted on said table, and means for moving the slide along the table to vary the positions of the fingers in respect to the carrier.

42. A target trap comprising a frame having a table, a target carrier which is mounted to swing on said frame, guide means along the longitudinal edges of the carrier for guiding a target, a pair of spaced angling fingers extending through one guide means and adapted to have a target positioned therebetween, a slide carrying said fingers mounted on said table, means for moving the slide along the table to vary the positions of the fingers in respect to the carrier, and means by which said fingers may be varied in position in respect to the slide individually.

CHARLES O. CAROTHERS.